United States Patent
Feuer et al.

(10) Patent No.: US 8,611,741 B2
(45) Date of Patent: Dec. 17, 2013

(54) METHOD FOR MEASURING SIGNAL QUALITY IN WDM OPTICAL NETWORKS

(75) Inventors: Mark Feuer, Colts Neck, NJ (US); Mikhail Brodsky, Millburn, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 506 days.

(21) Appl. No.: 12/614,469

(22) Filed: Nov. 9, 2009

(65) Prior Publication Data

US 2011/0110657 A1     May 12, 2011

(51) Int. Cl.
*H04B 10/08* (2011.01)
*H04B 17/00* (2006.01)
*H04J 14/00* (2006.01)
*H04J 4/00* (2006.01)

(52) U.S. Cl.
USPC .................................. 398/26; 398/77; 398/78

(58) Field of Classification Search
None
See application file for complete search history.

(56) References Cited

U.S. PATENT DOCUMENTS

| | | | |
|---|---|---|---|
| 6,795,607 B1 * | 9/2004 | Archambault et al. | 385/24 |
| 2003/0215236 A1 * | 11/2003 | Manifold | 398/79 |
| 2004/0161233 A1 * | 8/2004 | Zalevsky et al. | 398/26 |
| 2006/0195501 A1 * | 8/2006 | Feldhaus et al. | 708/400 |
| 2009/0052891 A1 * | 2/2009 | DeLew et al. | 398/26 |

OTHER PUBLICATIONS

Chen et al., "Optical Signal-to-Noise Ratio Monitoring Using Uncorrelated Signal-Spontaneous Beat Noise", 2005, Journal: Test, vol. 17, No. 11, pp. 2484-2486.*

* cited by examiner

*Primary Examiner* — Ken Vanderpuye
*Assistant Examiner* — Darren E Wolf
(74) *Attorney, Agent, or Firm* — Wolff & Samson, PC

(57) ABSTRACT

A method and memory medium in a wavelength division multiplexing (WDM) network that communicates multiplexed signals representing a plurality of communication channels to determine received signal quality are disclosed. Generally, the signals format the plurality of communication channels to impart a distinctive noise profile in time or frequency for each channel; and collectively process the channels at a digital signal processing device to measure the signal-to-noise ratio.

20 Claims, 6 Drawing Sheets

METHOD FOR MEASURING SIGNAL QUALITY IN WDM OPTICAL NETWORKS

FIELD OF THE DISCLOSURE

The present disclosure relates generally to communication networks, and more particularly, to a method for measuring signal quality in a Wave Division Multiplexing (WDM) Optical Network.

BACKGROUND

Wave division multiplexing (WDM) optical networks are well known in the art. A WDM channel is typically transmitted by a single mode semiconductor laser. Information to be communicated is imposed on the light by modulating the laser current or by externally modulating the light by applying a voltage to a modulator coupled to the laser source. A receiver employs a photo-detector that converts the light into electric current. Typically, modulation may affect the amplitude of the light or the phase of the light, or both.

Regardless of whether signaling is based on phase-shift-keying (PSK), Amplitude-Shift Keying (ASK), or the simplest form of ASK, On-Off Keying (OOK), the most universal impairment of the optical signals is due to the accumulation of noise. Electrical noise can arise in the transmitter or especially in the receiver, but in optical communication networks covering long distances, the dominant source of noise is usually the buildup of Amplified Spontaneous Emission (ASE) from the optical amplifiers used to overcome transmission and switching losses. At the receiver end of an optical link, this spontaneous emission interacts with itself and with the optical signal to create electrical noise known as spontaneous-spontaneous beat noise or signal-spontaneous beat noise. The degradation due to ASE is often characterized by the Optical Signal-to-Noise Ratio (OSNR), defined as the ratio of the signal power in a single wavelength channel, divided by the noise power within a band of 0.1 nm, in the same wavelength channel.

Multipoint optical networks present a challenging environment for signal quality measurements, such as OSNR measurements. FIG. 1 shows a graph 100 of optical power density as a function of wavelength in a multipoint optical network. The noise level around a wavelength will vary, as shown by the height of the local noise levels 102. Additionally, for each WDM signal 104, the OSNR for each wavelength channel may be quite different from adjacent channels, due to the different path traversed by each wavelength channel through the network. Thus, in order to measure OSNR (or other measures of signal quality) in a multipoint WDM network, a narrow optical filter is typically used to select a single channel, or a part of a channel, to sample the signal quality of one optical wavelength at a time. The filter is a relatively expensive element, so it must be shared and tuned sequentially among a plurality of wavelengths to share its cost. Alternatively, a dispersive element may be used to direct wavelength channels to multiple photodetectors in parallel, adding to the photodetector cost.

Measuring OSNR should be possible by inspecting the time dependence of the signal-spontaneous (SSP) beat noise, provided the signal is known. FIGS. 2a through 2d show waveforms of photocurrent vs. time for an amplified optical link in which the signal is a simple on-off square wave. The received waveform as shown in FIG. 2a can be decomposed into the sum of the non-stochastic components (signal plus the time-averaged ASE power as an offset) as shown in FIG. 2b, the time-stationary noise components (i.e. thermal noise and spontaneous-spontaneous beat noise) as shown in FIG. 2c, and finally the noise components which switch on and off in time synchronously with the signal, comprising shot noise and signal-spontaneous beat noise as shown in FIG. 2d. For this example, it is assumed that the received power is reasonably high, thus the shot noise and thermal noise are negligible. FIG. 2d shows an obvious repetitive pattern at the period of the signal square wave, so it may be expected to observe a conspicuous feature in the Power Spectral Density (PSD) of the photocurrent at modulation frequency $\Delta$.

A paper by Rossi, Dimmick, and Blumenthal (Journal of Lightwave Technology, vol. 18, pp. 1639-1648, and included herein by reference) discusses a scheme to extract OSNR values in WDM systems from the Carrier-to-Noise Ratio (CNR) of RF subcarriers. However, Rossi's method does not appear to work in a network where the noise level varies from one channel to another. Standard analysis of the CNR (see, for example, the book chapter by Mary Phillips and Ted Darcie 'Lightwave Analog Video Transmission', chapter 14 in Optical Fiber Telecommunications IIIA, Academic Press 1997, and included herein by reference) shows no frequency peak in the PSD of the SSP term, computing the SSP noise as a constant appropriate to the time-averaged signal power.

OSNR measurement also becomes extremely challenging as systems move towards higher spectral efficiency. As data rates per channel rise, the wavelength range occupied by each modulated signal increases. At the same time, systems are being designed with closer channel spacing, in order to pack more channels within the wavelength range accessible to practical optical amplifiers. Both of these developments tend to eliminate the well-defined noise shoulders framing each channel as shown in FIG. 1. In high spectral-efficiency systems, there may be no wavelengths where the noise can be measured separately from the signal, prohibiting the traditional method of interpolation from being used.

Thus, there exists a need for a method of signal quality measurement that can be implemented in WDM optical networks, providing rapid, accurate and low-cost measurements of multiple wavelength channels without requiring a narrow optical filter or a wavelength-dispersive element. There also exists a need for a method of OSNR measurement which can measure both noise and signal at exactly the same wavelength, without the need to interpolate from noise-only measurements of flat channel shoulders.

SUMMARY OF THE DISCLOSURE

In accordance with a first aspect, a method for determining signal quality in a wavelength division multiplexing (WDM) network that communicates multiplexed signals representing a plurality of communication channels is disclosed herein. The method comprises formatting the plurality of communication channels to impart a distinctive noise profile in time or frequency for each channel; and collectively processing the channels at a digital signal processing device to measure the signal-to-noise ratio.

In accordance with another aspect, a memory medium containing machine encoded instructions thereon, which when executed by at least one processor, enables a device in a wavelength division multiplexing (WDM) network that communicates multiplexed signals representing a plurality of communication channels to determine received signal quality. The memory medium comprises instructions that enable the device to collectively process the channels to measure the signal-to-noise ratio based on the distinctive noise profile of each channel. In some embodiments, a separate memory medium and processor may be used to format the plurality of communication channels to impart a distinctive noise profile in time or frequency for each channel.

These aspects of the disclosure and further advantages thereof will become apparent to those skilled in the art as the present disclosure is described with particular reference to the accompanying drawings.

DETAILED DESCRIPTION OF THE PREFERRED EMBODIMENT

Embodiments of the disclosure will be described with reference to the accompanying drawing figures wherein like numbers represent like elements throughout. Before embodiments of the disclosure are explained in detail, it is to be understood that the disclosure is not limited in its application to the details of the examples set forth in the following description or illustrated in the figures. The disclosure is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 1:
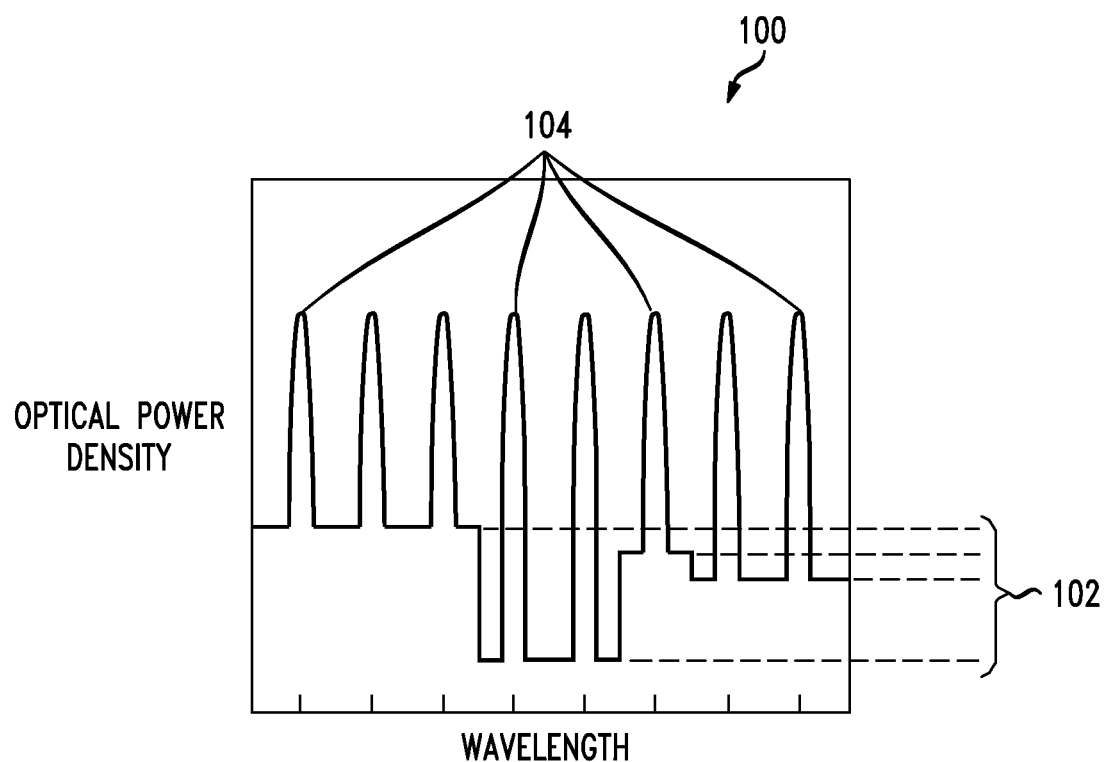
FIG. 1 shows a graph of optical power density as a function of wavelength in a multipoint optical network.
Figure 2:
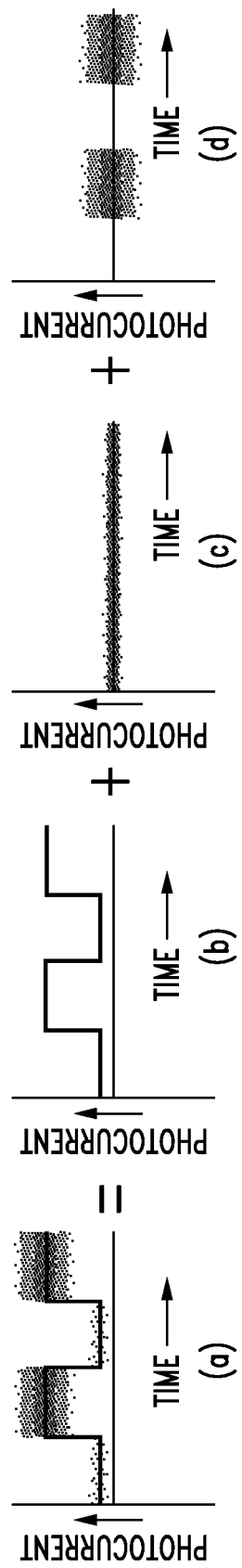
FIGS. 2a through 2d show waveforms of photocurrent vs. time for an amplified optical link in which the signal is a simple on-off square wave.
Figure 3:
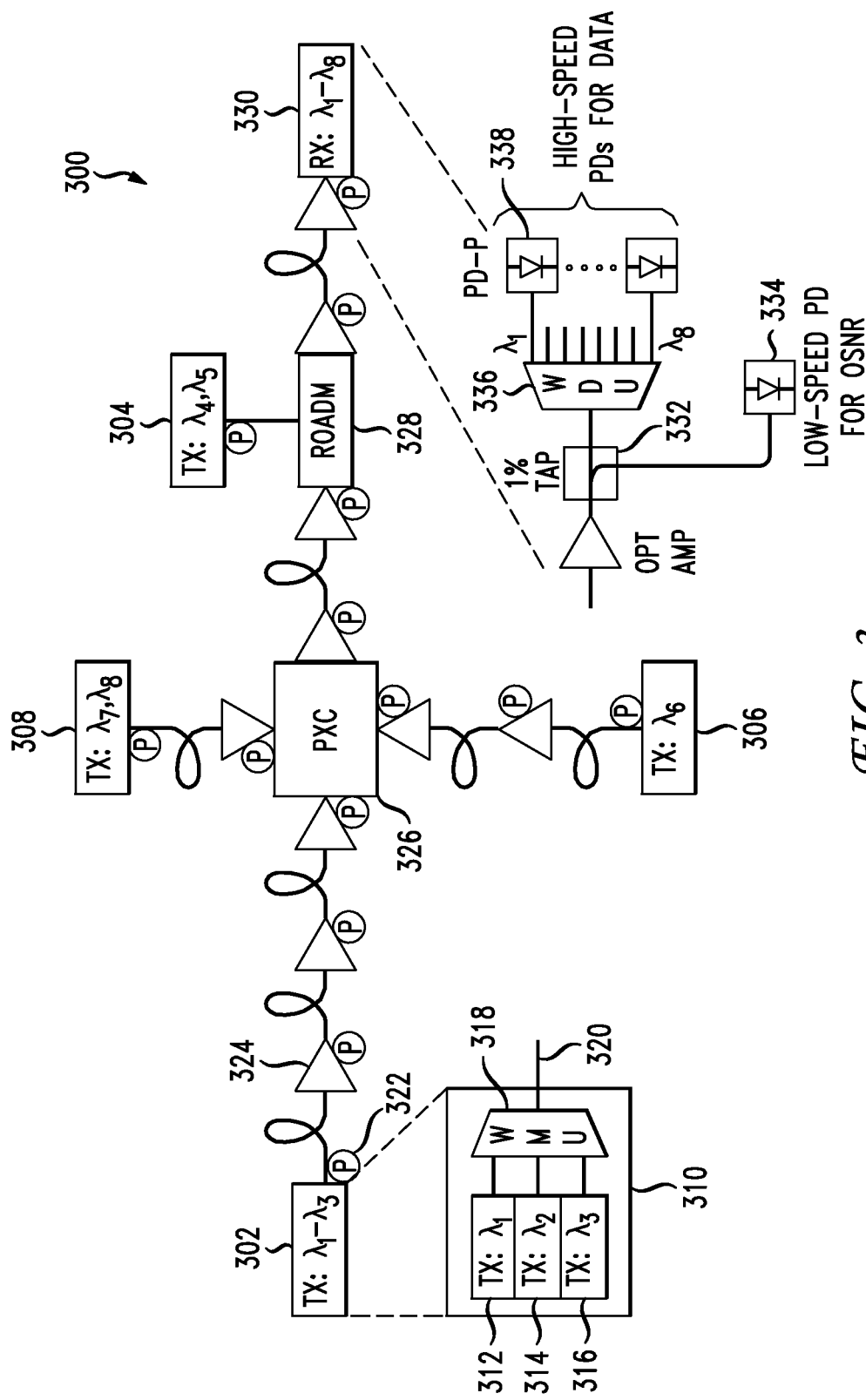
FIG. 3 is a high-level schematic of an optical network.

FIG. 3 is a high-level schematic of a photonic network 300, in which light signals arising from a plurality of locations pass through variety of photonic system components to arrive at their common destination. A plurality of optical transmitters, (Tx) 302, 304, 306, 308, add optical signals $\lambda_1$-$\lambda_3$, $\lambda_4$-$\lambda_5$, $\lambda_6$, and $\lambda_7$-$\lambda_8$, respectively, to the network 300. As shown in Tx 302 and expanded in 310, individual optical wavelength signals Tx $\lambda_1$ 312, Tx $\lambda_2$ 314 and Tx $\lambda_3$ 316 are combined via a Wavelength Multiplexing Unit (MPU) 318 to a single output 320. Similarly, optical signals are combined at Tx 304 and Tx 308, neither shown. A plurality of Monitor Devices 322, as represented by the symbol (P), are placed throughout the system to measure optical signal power and provide feedback to the particular optical device they are associated with. Additionally, a plurality of Optical Amplifiers 324, are placed throughout the system to boost optical signal power, as needed. A Photonic Cross-Connect (PXC) 326 is utilized to combine optical signals, in this example three signals, the signal from Tx 302 comprising three individual optical wavelengths, Tx 308 comprising two individual wavelengths and Tx 306 comprising a single wavelength, into an single optical signal comprising six individual optical wavelengths, $\lambda_1$, $\lambda_2$, $\lambda_3$, $\lambda_6$, $\lambda_7$ and $\lambda_8$. This single signal is then an input to a Reconfigurable Optical Add/Drop Multiplexer (ROADM) 328, which will further add a signal from Tx 304 comprising two individual optical wavelengths to the output of ROADM 328 into a single optical signal comprising eight individual optical wavelengths, $\lambda_1$, $\lambda_2$, $\lambda_3$, $\lambda_4$, $\lambda_5$, $\lambda_6$, $\lambda_7$ and $\lambda_8$. This optical signal is then an input to the Optical Receiver (Rx) 330, which is further comprised of a 1% tap 332, a low-speed Photodetector 334, a Wavelength Demultiplexing Unit (WDU) 336 and a plurality of Photodetectors 338, one for each optical wavelength. Note that each Monitor Devices 322 includes a low-speed photodetector (not shown) that is similar to the photodetector 334, and this included photodetector enables signal quality measurement at any Monitor Device without the need for a WDU or multiple high-speed photodetectors.

In accordance with an aspect of the disclosure, each optical wavelength channel is formatted at its source in a manner to impart a distinctive profile in time or frequency to the signal noise. In this connection, when the combined noise from multiple WDM channels is received at a single photodetector, the noise contributions associated with each wavelength can be extracted separately, thereby allowing signal quality measurements to be carried out in parallel across multiple channels by analyzing a single electrical signal from a shared photodiode.

Figure 4:
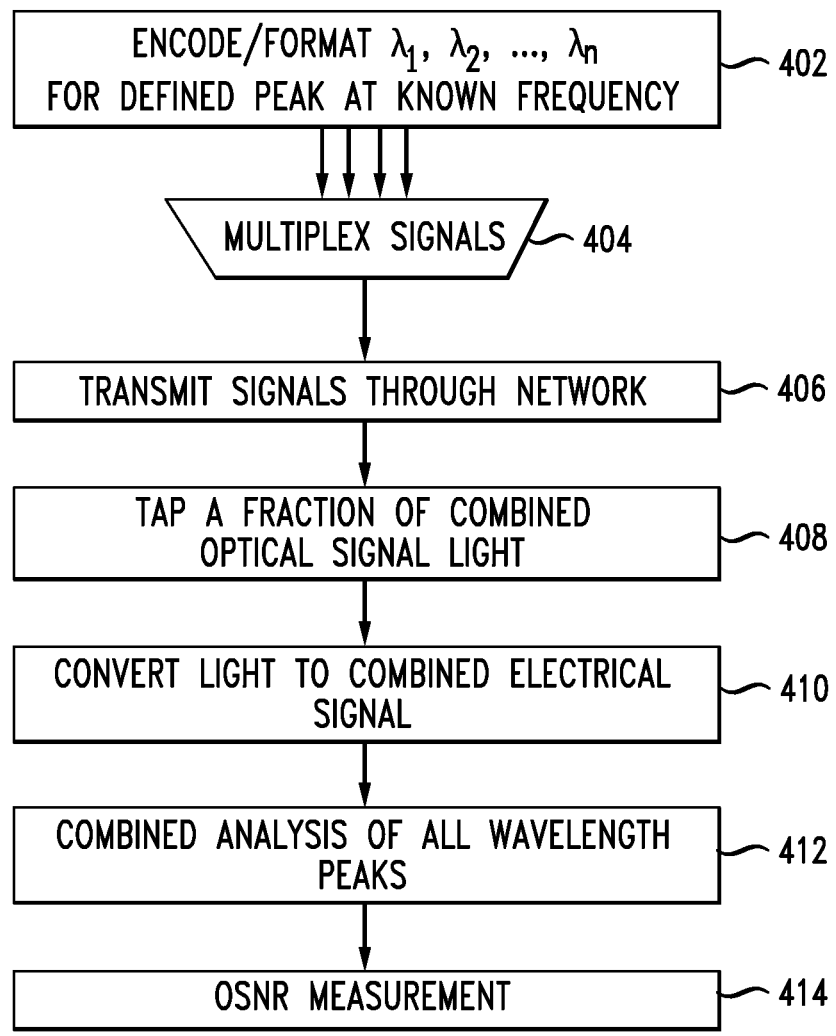
FIG. 4 is a flow diagram of an exemplary embodiment in accordance with the disclosure.

FIG. 4 is a flow diagram of an exemplary embodiment where individual WDM signals in each optical channel are first encoded or formatted such that after detection, a frequency-dependent scalar parameter derived from the detected noise will have at least one well-defined peak at a known frequency, in a pattern uniquely chosen for its wavelength slot. At step 402 the optical channels are encoded/formatted for a defined peak at a known frequency. At step 404 the signals are multiplexed into a combined signal. At step 406 the multiplexed signals are sent through a communication network as shown and described above. At step 408 a fraction of the signal light is tapped off for OSNR measurement. At step 410, the tapped light is converted to an electrical signal. At step 412, the aggregate electrical signal is processed to generate the frequency-dependent scalar parameter. Finally, at step 414 the OSNR measurement is made.

In considering how to define the frequency-dependent scalar parameter used for OSNR measurement, it is important to note that the PSD, sometimes called the frequency spectrum, is not a suitable choice. Although some published papers, such as Dimmick, Rossi, and Blumenthal referenced above suggest that PSD can be used to extract the OSNR, a careful mathematical analysis shows that the PSD of both spontaneous-spontaneous and signal-spontaneous beat noise is flat over frequency. The frequency dependence is more subtle, appearing only in the phase component of the Fourier transform of the electrical signal, not in the magnitude component. One effective choice is the autocorrelation of the Fourier transform of the electrical signal. Another possibility is to square the electrical signal first, and then take the PSD of the square. The definition of the frequency-dependent scalar parameter is discussed further in Appendix A.

The measurement of the frequency-dependent scalar parameter is necessarily subject to some uncertainty. Under some circumstances, it may be possible to reduce the uncertainty in the inferred signal-to-noise ratio by more complex computations involving the frequency-dependent scalar parameters many or all of the channels, to calculate the signal-to-noise ratio for each channel.

Figure 5:
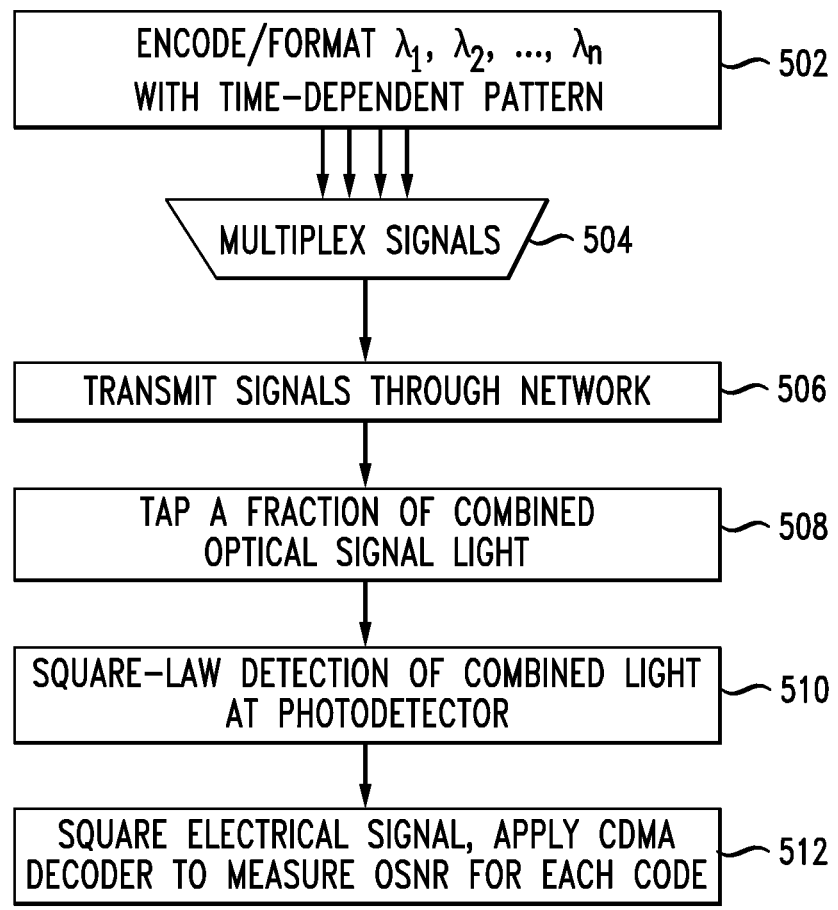
FIG. 5 is a flow diagram of another exemplary embodiment in accordance with the disclosure.

FIG. 5 is a flow diagram of another exemplary embodiment where individual WDM signals in each optical channel are first encoded or formatted with a time dependent pattern uniquely chosen for its respective wavelength slot. At step 502 the optical channels are encoded/formatted with a time dependent pattern. At step 504 the signals are multiplexed into a combined multiplexed optical signal. At step 506 the multiplexed signals are sent through the representative network. At step 508 a fraction of the signal light is tapped off for OSNR measurement. At step 510, the individual wavelengths are square-law detected at a photodetector. At step 512 the electrical signal is squared and a time-pattern decoder, for example a CDMA decoder, is used to measure OSNR for each code (wavelength). The mathematical details of the time-domain analysis are given in Appendix B.

In the CDMA example, all optical signals sharing the fiber are encoded with distinct CDMA patterns. Then, square-law detection in the photodetector transfers the signal's CDMA pattern as a modulation of the signal-spontaneous beat noise. After squaring the modulated noise, a CDMA pattern decoder is utilized to unambiguously measure the OSNR of all wavelength channels. As discussed in the above embodiment, the accuracy of the OSNR measurement for a given wavelength may be enhanced by performing a combined analysis of all wavelengths' CDMA test patterns, rather than separately analyzing only the individual CDMA pattern associated with the wavelength under test.

This method of signal-quality measurement is particularly advantageous in networks which utilize the LightLabel system for lightpath tracing, as shown in U.S. Pat. No. 7,580,632, issued Aug. 25, 2009, entitled METHOD AND APPARATUS FOR MANAGING LIGHTPATHS IN OPTICALLY-ROUTED NETWORKS, and U.S. Pat. No. 7,512,342 issued Mar. 31, 2009, entitled DIGITAL ENCODING OF LABELS FOR OPTICAL PACKET NETWORKS, which are incorporated by reference herein and assigned to the assignee of the present application, since its implementation will require little or no additional hardware beyond that which is used for the lightpath tracing.

The above-described processes may be implemented by program modules that are executed by a computer. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, minicomputers, mainframe computers and the like. The disclosure may also be employed in distributed computing environments, where tasks are performed by remote processing devices that are linked through a communications network. In a distributed computing environment, modules may be located in both local and remote memory storage devices.

Figure 6:
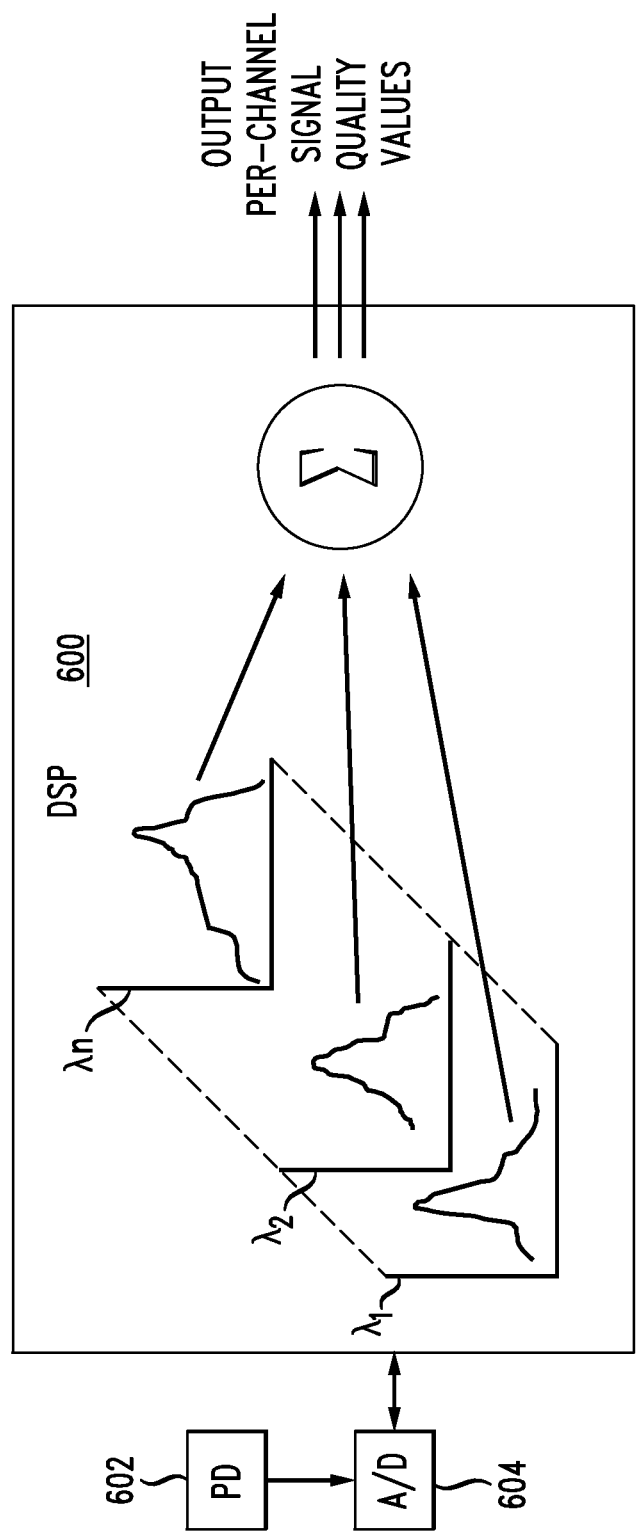
FIG. 6 is an exemplary processing module for implementing a methodology of the disclosure.

An exemplary processing module for implementing the methodology above may be hardwired in the DSP 600 generally shown in FIG. 6, or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art. Continuing with reference to FIG. 6, an analog-to-digital (A/D) converter 604 receives signals from photodetector 602 and converts the received optical signals to the external domain at the DSP 600.

The term "computer-readable medium" as employed herein refers to any machine encoded medium that provides or participates in providing instructions to the processor. Such a medium includes but is not limited to non-volatile media, volatile media and transmission media. For example, non-volatile media can include optical or magnetic memory disks. Volatile media include dynamic random access memory (DRAM), which typically constitutes the main memory. Common expedients of computer-readable media are well-known in the art and need not be described in detail here.

As described above, the DSP is programmed via software, hardware and/or a combination thereof, to implement the aforementioned processes for measuring signal quality as a function of a defined peak at a known frequency or encoded time dependent patterns.

The foregoing detailed description is to be understood as being in every respect illustrative and exemplary, but not restrictive, and the scope of the disclosure disclosed herein is not to be determined from the description of the disclosure, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure.

APPENDIX A—Frequency domain analysis.

Analysis: Single Channel PSD

The photocurrent can be expressed with only a single signal and ASE noise that is flat with wavelength as follows:

$$i(t) = \Phi \rho \left[ s(t) + \frac{1}{\Gamma}\left(\frac{B_o}{12.5 \, \text{GHz}}\right) + n_{spsp}(t) + n_{sisp}(t) \right] \quad (A1)$$

where $\Phi$ is the average signal power, $\rho$ is the responsivity of the photoreceiver, s(t) is the signal waveform, normalized so that its time-average is unity, $\Gamma$ is the OSNR, $B_o$ is the optical bandwidth, $n_{spsp}(t)$ is a white random process representing spontaneous-spontaneous noise, and $n_{sisp}(t)$ is a stochastic process representing signal-spontaneous noise. The two noise terms can be expressed in terms of $n_\alpha(t)$ and $n_\beta(t)$, two independent white random processes with variance of unity:

$$n_{spsp}(t) = \frac{1}{\Gamma}\left(\frac{\sqrt{B_o B_e}}{12.5 \, \text{GHz}}\right) n_\alpha(t) = \frac{1}{2}\sqrt{\frac{B_o}{B_e}} \cdot N_0^2 \cdot n_\alpha(t) \quad (A2)$$

$$n_{sisp}(t) = \left(\sqrt{\frac{2}{\Gamma} \cdot \frac{B_e}{12.5 \, \text{GHz}}}\right)(s(t) * n_\beta(t)) = N_0 \cdot (s(t) * n_\beta(t)) \quad (A3)$$

where $B_e$ is the electrical bandwidth and $$N_0 \equiv \sqrt{\frac{2}{\Gamma} \cdot \frac{B_e}{12.5 \, \text{GHz}}}.$$

To obtain (2) and (3), the usual assumption that $B_e \ll B_o$. Note that the signal-spontaneous noise term is not in general stationary, or even wide-sense stationary, so the Wiener-Khinchin theorem does not apply. In the simple case where s(t) represents a sinusoidal tone of 100% modulation depth and frequency $\Delta$:

$$s(t) = 1 - \cos(2\pi\Delta t) \quad (A4)$$

The received signal level and the (constant) ASE level can be measured to a reasonable accuracy by time-averaging, and subtract them off to obtain the zero-mean stochastic variable:

$$y(t) = \frac{i(t)}{\Phi\rho} - \left[s(t) + \frac{1}{\Gamma}\left(\frac{B_o}{12.5\,\text{GHz}}\right)\right] = n_{spsp}(t) + n_{sisp}(t) \quad (A5)$$

Note that in this single-channel example, the extraction of the DC offset provides $\Gamma$ directly, but in the general multi-channel case it will not be possible to extract multiple $\Gamma_u$ values from the (single) measured offset. First is shown that the Power Spectral Density (PSD) of y(t) does not have any characteristic peak at $\Delta$ or its harmonics—in fact the PSD is flat with frequency (i.e., white). Since $n_{spsp}(t)$ and $n_{sisp}(t)$ are uncorrelated, the PSD of y(t) is simply the sum of the PSDs of the two terms.

$$D(y(t)) = D(n_{spsp}(t)) + D(n_{sisp}(t)) = \frac{N_0^4}{4} \cdot \frac{B_o}{B_e} + E\{|\eta_{sisp}(f)|^2\} \quad (A6)$$

where $E\{\ \}$ represents the expectation value of the ensemble average and $\eta_{sisp}(f)$ is the Fourier transform of $n_{sisp}(t)$. It can be obtained from the convolution theorem:

$$\eta_{sisp}(f) = \Im(n_{sisp}(t)) = N_0 \cdot \Im(s(t)) \otimes \Im(n_\beta(t)) = N_0 \cdot \Im(s(t))$$
$$\otimes \eta_\beta(f) \quad (A7)$$

where the symbol $\otimes$ represents convolution. Then using eq. (4) to compute the Fourier transform of s(t), it is determined that:

$$\eta_{sisp}(f) = \frac{N_0}{2} \cdot [(2\delta(0) + \delta(\Delta) + \delta(-\Delta)) \otimes \eta_\beta(f)] \quad (A8)$$

$$\eta_{sisp}(f) = \frac{N_0}{2} \cdot (2\eta_\beta(f) + \eta_\beta(f + \Delta) + \eta_\beta(f - \Delta)). \quad (A9)$$

In eq. (8) and below, $\delta(f)$ represents the Dirac delta function. The Fourier transform of the white noise function, $\eta_\beta(f)$, has uniform magnitude and random phase over frequency. Because uncorrelated phases are summed, the magnitude of $\eta_{sisp}(f)$ will vary with frequency for any specific measurement instance. However, the PSD represents the expectation value of the ensemble average of $|\eta_{sisp}(f)|^2$, and all of the cross terms have an expectation value of zero, so the PSD may be written:

$$D(n_{sisp}(t)) = \frac{N_0^2}{4} \cdot [4|\eta_\beta(f)|^2 + |\eta_\beta(f+\Delta)|^2 + |\eta_\beta(f-\Delta)|^2] = \frac{3}{2} \cdot N_0^2 \quad (A10)$$

PSD for the stochastic part of the received waveform can then be expressed by:

$$D(y(t)) = N_0^2 \cdot \left(\frac{N_0^2}{4} \cdot \frac{B_o}{B_e} + \frac{3}{2}\right) \quad (A11)$$

As anticipated above, the PSD is constant over frequency, and a measurement of the electrical power spectrum cannot be used to deduce the OSNR. Normally, one associates this flat power spectrum with a stationary white noise waveform. However, a wide range of (non-stationary) modulated noise waveforms is also possible, representing different envelope functions s(t).

From eq. (11) it is apparent that the shape of the PSD does not depend on s(t), so the PSD cannot be used to extract OSNR values in a multichannel system with a shared photodetector. An alternative analysis method is thus needed, and described below.

Analysis: Single Channel Autocorrelation of Fourier Transform

Continuing with the sinusoidal tone signal specified in (4), it is clear from (9) that a simple frequency dependence is present in the signal-spontaneous noise term, even though it is not visible in the PSD. One way to extract that frequency dependence is to examine the autocorrelation (signal-processing sense) of the Fourier transform:

$$R_{yy}(F) \equiv \int_{-\infty}^{\infty} [\eta^*_{sisp}(f-F) + \eta^*_{spsp}(f-F)] \cdot [\eta_{sisp}(f) + \eta_{spsp}(f)] df \quad (A12)$$

Since $\eta_\alpha$ and $\eta_\beta$ are independent white noise processes, the integrals of the cross-terms will vanish and thus:

$$R_{yy}(F) \equiv \int_{-\infty}^{\infty} \eta^*_{sisp}(f-F) \cdot \eta_{sisp}(f) df + \quad (A13)$$
$$\int_{-\infty}^{\infty} \eta^*_{spsp}(f-F) \cdot \eta_{spsp}(f) df = R_{\eta\eta}(F) + \frac{N_0^4}{4} \cdot \frac{B_o}{B_e} \cdot \delta(F)$$

Substituting from eq. (9) and collecting and evaluating terms:

$$R_{\eta\eta}(F) = \frac{N_0^2}{4} \cdot \int_{-\infty}^{\infty} [4\eta^*_\beta(f-F) \cdot \eta_\beta(f) + \quad (A14)$$
$$2\eta^*_\beta(f-F) \cdot \eta_\beta(f+\Delta) + 2\eta^*_\beta(f-F) \cdot \eta_\beta(f-\Delta) +$$
$$2\eta^*_\beta(f-F+\Delta) \cdot \eta_\beta(f) + \eta^*_\beta(f-F+\Delta) \cdot \eta_\beta(f+\Delta) +$$
$$\eta^*_\beta(f-F+\Delta) \cdot \eta_\beta(f-\Delta) + 2\eta^*_\beta(f-F-\Delta) \cdot \eta_\beta(f) +$$
$$\eta^*_\beta(f-F-\Delta) \cdot \eta_\beta(f+\Delta) + \eta^*_\beta(f-F-\Delta) \cdot \eta_\beta(f-\Delta)] df$$

Since $\eta_\beta$ is a white noise process, it has constant magnitude and random phase at all points. Then after again collecting and evaluating terms:

$$R_{yy}(F) = \frac{N_0^2}{4} \cdot \left[\left(6 + N_0^2 \cdot \frac{B_o}{B_e}\right)\delta(F) + \quad (A15)\right.$$
$$\left. 4\delta(F+\Delta) + 4\delta(F-\Delta) + \delta(F+2\Delta) + \delta(F-2\Delta)\right]$$

Eq. (15) shows clear peaks at the tone frequency $\Delta$, so the autocorrelation of the Fourier transform provides an effective tool for measuring OSNR in a multi-channel optical signal with a shared photodetector. The OSNR of the channel can therefore be extracted from the height of the peak at $\Delta$.

$$\Gamma = \frac{2}{N_0^2} \cdot \frac{B_e}{12.5 \text{ GHz}} = \frac{2B_e}{12.5 \text{ GHz}} \cdot \left( \int_{\Delta-\partial}^{\Delta+\partial} R_{yy}(\zeta) d\zeta \right)^{-1} \quad (A16)$$

Analysis: Multiple Channel Autocorrelation of Fourier Transform

The preceding analysis was completed for a spectrum of broad flat ASE noise and a single signal wavelength. Now consider an example in which the photodetector is shared among U wavelengths, each with its own ASE level, signal level and tone modulation frequency. The photocurrent now becomes:

$$i(t) = \rho \left[ \sum_{u=1}^{U} \Phi_u \left( s_u(t) + \frac{1}{\Gamma_u} \left( \frac{B_o/U}{12.5 \text{ GHz}} \right) \right) + n_{sisp}^{all}(t) + n_{spsp}^{all}(t) \right] \quad (A17)$$

where $\Phi_u$ is the time-average signal power of wavelength u, $s_u(t)$ is the signal of wavelength u, and so on. The new parameter, $n_{spsp}^{all}(t)$ is a white random process representing the aggregate spontaneous-spontaneous noise from all wavelength channels.

$$n_{spsp}^{all}(t) = \sqrt{\sum_{u=1}^{U} \frac{\Phi_u^2}{\Gamma_u^2} \cdot \frac{B_o B_e / U}{(12.5 \text{ GHz})^2}} \cdot n_\alpha(t) = \quad (A18)$$

$$\sqrt{\frac{B_o/U}{4B_e} \sum_{u=1}^{U} \Phi_u^2 \cdot N_u^4} \cdot n_\alpha(t) \equiv N_{spall}^2 \cdot n_\alpha(t)$$

$$n_{sisp}^{all}(t) = \sum_{u=1}^{U} \Phi_u \cdot \sqrt{\frac{2}{\Gamma_u} \cdot \frac{B_e}{12.5 \text{ GHz}}} \cdot (s_u(t) \cdot n_\beta(t)) \equiv \quad (A19)$$

$$\sum_{u=1}^{U} \Phi_u \cdot N_u \cdot (s_u(t) \cdot n_\beta^u(t))$$

where $N_u$ and $N_{spall}$ are defined, and each $n_\beta^u(t)$ is an independent white random process. For specificity, consider an another example where:

$$s_u(t) = 1 - \cos(2\pi \Delta_u t) \quad (A20)$$

and the $\Delta_u$ values are chosen so that no individual $\Delta_u$ is an integer multiple of any other $\Delta_u$. Then using eq. (9), the Fourier transform of $n_{sisp}^{all}(t)$ yields:

$$\eta_{sisp}^{all}(f) = \sum_{u=1}^{U} \Phi_u \cdot \frac{N_u}{2} \cdot (2\eta_\beta^u(f) + \eta_\beta^u(f + \Delta_u) + \eta_\beta^u(f - \Delta_u)) \quad (A21)$$

As before, the received signal level and the (constant) ASE level are subtracted to define the zero-mean stochastic variable:

$$Y(t) \equiv \frac{i(t)}{\rho} - \sum_{u=1}^{U} \Phi_u \left( s_u(t) + \frac{1}{\Gamma_u} \left( \frac{B_o/U}{12.5 \text{ GHz}} \right) \right) = n_{sisp}^{all}(t) + n_{spsp}^{all}(t) \quad (A22)$$

And the autocorrelation of the Fourier transform:

$$R_{YY}(F) \equiv \quad (A23)$$

$$\int_{-\infty}^{\infty} [(\eta_{sisp}^{all}(f-F))^* + (\eta_{spsp}^{all}(f-F))^*] \cdot [\eta_{sisp}^{all}(f) + \eta_{spsp}^{all}(f)] df$$

As before, the integrals of the cross-terms will vanish and after collecting terms:

$$R_{YY}(F) \equiv \int_{-\infty}^{\infty} (\eta_{sisp}^{all}(f-F))^* \cdot \eta_{sisp}^{all}(f) df + \int_{-\infty}^{\infty} (\eta_{spsp}^{all}(f-F))^* \cdot \quad (A24)$$

$$\eta_{spsp}^{all}(f) df$$

$$= \int_{-\infty}^{\infty} (\eta_{sisp}^{all}(f-F))^* \cdot \eta_{sisp}^{all}(f) df + \frac{N_{spall}^4}{4} \cdot \delta(F)$$

Because each $n_\beta^u(t)$ is independent, more cross-terms vanish in the left-hand integral, the equation may be expressed as, and further simplified:

$$R_{YY}(F) = \sum_{u=1}^{U} \Phi_u \cdot \frac{N_u^2}{4} \cdot \quad (A25)$$

$$\int_{-\infty}^{\infty} \{[2\eta_\beta^u(f-F) + \eta_\beta^u(f-F+\Delta_u) + \eta_\beta^u(f-F-\Delta_u)]^* \cdot$$

$$[2\eta_\beta^u(f) + \eta_\beta^u(f+\Delta_u) + \eta_\beta^u(f-\Delta_u)]\} df + \frac{N_{spall}^4}{4} \cdot \delta(F)$$

$$R_{YY}(F) = \quad (A26)$$

$$\sum_{u=1}^{U} \Phi_u \cdot \frac{N_u^2}{4} \cdot [(6\delta(F) + 4\delta(F+\Delta_u) + 4\delta(F-\Delta_u) + \delta(F+2\Delta_u) +$$

$$\delta(F-2\Delta_u)] + \frac{N_{spall}^4}{4} \cdot \delta(F)$$

As in the single-channel case, the definition of $N_u$ may be inverted to extract the OSNR of channel u.

$$\Gamma_u = \frac{2}{N_u^2} \cdot \frac{B_e}{12.5 \text{ GHz}} = \Phi_u \cdot \frac{2B_e}{12.5 \text{ GHz}} \cdot \left( \int_{\Delta_u-\partial}^{\Delta_u+\partial} R_{YY}(\zeta) d\zeta \right)^{-1} \quad (A27)$$

Thus, the autocorrelation of the Fourier transform of the stochastic component of the aggregate photocurrent is seen to contain discrete peaks corresponding to the tone applied to each of the wavelength channels, and the height of each peak is related to the OSNR of its corresponding channel.

APPENDIX B—Time-Domain Analysis

Analysis: Square of Time-Domain Waveform

An alternative data analysis method uses the expectation value of $|y(t)|^2$. First, consider the single-channel case. From eqs. (3), (4), and (5), it is seen that:

$$\Psi(t) \equiv E\{|y(t)|^2\} = E\{[n_{spsp}(t) + n_{sisp}(t)]^2\} = E\{[n_{spsp}(t)]^2\} + \quad (B1)$$

$$E\{[n_{sisp}(t)]^2\}$$

-continued $$= N_0^2 \left( \frac{B_o}{4B_e} N_0^2 + s^2(t) \right)$$

Note that $\Psi(t)$ is a deterministic (i.e., non-stochastic) function whose Fourier transform is given by:

$$\mathfrak{I}(\Psi(t)) = \frac{N_0^4}{4} \cdot \frac{B_o}{B_e} \cdot \delta(0) + \frac{N_0^2}{4} \cdot (6\delta(0) + 4\delta(\Delta) + 4\delta(-\Delta) + \delta(2\Delta) + \delta(-2\Delta)) \quad (B2)$$

The PSD of $\Psi(t)$, given by the square of the (real) Fourier transform, will have spectral peaks related to the modulation frequency $\Delta$.

The extension to multiple wavelengths is straightforward. Using eqs. (A17)-(A20) and (A22), plus the fact that each $n_\beta^u(t)$ is independent:

$$\Psi'(t) \equiv E\{|Y(t)|^2\} = \quad (B3)$$
$$E\{[n_{spsp}^{all}(t) + n_{sisp}^{all}(t)]^2\} = N_{spall}^4 + E\left\{ \left| \sum_{u=1}^{U} \Phi_u \cdot N_u \cdot (s_u(t) \cdot n_\beta^u(t)) \right|^2 \right\}$$

$$\Psi'(t) \equiv E\{|Y(t)|^2\} = E\{[n_{spsp}^{all}(t) + n_{sisp}^{all}(t)]^2\} = N_{spall}^4 + \sum_{u=1}^{U} \Phi_u^2 \cdot N_u^2 \cdot s_u^2(t) \quad (B4)$$

Then the Fourier transform of $\Psi'(t)$ is:

$$\mathfrak{I}(\Psi'(t)) = N_{spall}^4 \cdot \delta(0) + \sum_{u=1}^{U} \Phi_u^2 \cdot N_u^2 \cdot \quad (B5)$$
$$\left( \frac{3}{2} \cdot \delta(0) + \delta(\Delta_u) + \delta(-\Delta_u) + \frac{1}{4} \cdot \delta(2\Delta_u) + \frac{1}{4} \cdot \delta(-2\Delta_u) \right)$$

By choosing tone frequencies so that no tone is an integer multiple of any other tone, one can assure that all the individual $\Gamma_u$ values can be extracted from the various peaks of this function.

This approach also generalizes easily to the case where the modulation signals $s_u(t)$ are digital signals, such as code-division multiple-access (CDMA) signatures.

$$s_u(t) = \text{binarysequence} \quad (B6)$$

Eq. (41) continues to apply, but now the $s_u(t)$ represent CDMA signature sequences. Instead of computing the Fourier transform of $\Psi'(t)$, a CDMA detector can be applied to $\Psi'(t)$.

We claim:

1. A method for determining signal quality in a wavelength division multiplexing network comprising:
    formatting each of a plurality of communication channels so that a transmitted signal corresponding to each channel carries a distinct profile in time, wherein the distinct profile in time is equivalent to a distinct profile in frequency;
    multiplexing signals associated with a plurality of formatted communication channels onto a combined signal;
    amplifying the combined signal in a medium that adds amplified spontaneous emission to the combined signal to generate an amplified combined signal;
    converting a portion of the amplified combined signal into an electrical signal containing signal-spontaneous beat noise;
    extracting from the electrical signal a time-dependent waveform of the signal-spontaneous beat noise;
    deriving from the time-dependent waveform of the signal-spontaneous beat noise a first scalar parameter proportional to an optical signal to noise ratio of one of a plurality of multiplexed communication channels in the combined signal; and
    deriving from the time-dependent waveform of the signal-spontaneous beat noise a second scalar parameter proportional to the optical signal to noise ratio of one other of the plurality of multiplexed communication channels in the combined signal.

2. The method of claim 1, wherein deriving the first scalar parameter and the second scalar parameter comprises computing a non-linear mathematical function of the time-dependent waveform of the signal-spontaneous beat noise.

3. The method of claim 2, wherein deriving the first scalar parameter and the second scalar parameter further comprises comparing the non-linear mathematical function of the time-dependent waveform of the signal-spontaneous beat noise to a mathematical function of the distinct profile in time of a communication channel.

4. The method of claim 3, wherein comparing the non-linear mathematical function of the time-dependent waveform of the signal-spontaneous beat noise to the mathematical function of the distinct profile in time of the communication channel comprises matching a frequency peak of the non-linear mathematical function of the time-dependent waveform of the signal-spontaneous beat noise to a frequency peak of a mathematical function of the distinct profile in time of the communication channel.

5. The method of claim 1, wherein formatting each of a plurality of communication channels comprises digital encoding of a payload data stream of the each of a plurality of communication channels.

6. The method of claim 5, wherein the digital encoding of a payload data stream comprises code-division multiple access encoding.

7. The method of claim 3, wherein the comparing the non-linear mathematical function of the time-dependent waveform of the signal-spontaneous beat noise to a mathematical function of the distinct profile in time of a communication channel is implemented by a code-division multiple access pattern decoder.

8. The method of claim 1, wherein the distinct profile in time is determined by its respective wavelength slot.

9. An apparatus for determining signal quality in a wavelength division multiplexing network comprising:
    a processor; and
    a memory to store computer program instructions the computer program instructions, when executed on the processor, cause the processor to perform operations comprising:
    formatting each of a plurality of communication channels so that a transmitted signal corresponding to each channel carries a distinct profile in time, wherein the distinct profile in time is equivalent to a distinct profile in frequency;
    multiplexing signals associated with a plurality of formatted communication channels onto a combined signal;
    amplifying the combined signal in a medium that adds amplified spontaneous emission to the combined signal to generate an amplified combined signal;

converting a portion of the amplified combined signal into an electrical signal containing signal-spontaneous beat noise;

extracting from the electrical signal a time-dependent waveform of the signal-spontaneous beat noise;

deriving from the time-dependent waveform of the signal-spontaneous beat noise a first scalar parameter proportional to an optical signal to noise ratio of one of a plurality of multiplexed communication channels in the combined signal; and deriving from the time-dependent waveform of the signal-spontaneous beat noise a second scalar parameter proportional to the optical signal to noise ratio of one other of the plurality of multiplexed communication channels in the combined signal.

10. The apparatus of claim 9, wherein deriving the first scalar parameter and the second scalar parameter comprises computing a non-linear mathematical function of the time-dependent waveform of the signal-spontaneous beat noise.

11. The apparatus of claim 10, wherein deriving the first scalar parameter and the second scalar parameter further comprises comparing the non-linear mathematical function of the time-dependent waveform of the signal-spontaneous beat noise to a mathematical function of the distinct profile in time of a communication channel.

12. The apparatus of claim 11, wherein comparing the non-linear mathematical function of the time-dependent waveform of the signal-spontaneous beat noise to the mathematical function of the distinct profile in time of the communication channel comprises matching a frequency peak of the non-linear mathematical function of the time-dependent waveform of the signal-spontaneous beat noise to a frequency peak of a mathematical function of the distinct profile in time of the communication channel.

13. The apparatus of claim 9, wherein formatting each of a plurality of communication channels comprises digital encoding of a payload data stream of the each of a plurality of communication channels.

14. The apparatus of claim 13, wherein the digital encoding of a payload data stream comprises code-division multiple access encoding.

15. The apparatus of claim 11, wherein the comparing the non-linear mathematical function of the time-dependent waveform of the signal-spontaneous beat noise to a mathematical function of the distinct profile in time of a communication channel is implemented by a code-division multiple access pattern decoder.

16. The apparatus of claim 9, wherein the distinct profile in time is determined by its respective wavelength slot.

17. A tangible computer readable medium storing computer program instructions for determining signal quality in a wavelength division multiplexing network, which, when executed on a processor, cause the processor to perform operations comprising:

formatting each of a plurality of communication channels so that a transmitted signal corresponding to each channel carries a distinct profile in time, wherein the distinct profile in time is equivalent to a distinct profile in frequency;

multiplexing signals associated with a plurality of formatted communication channels onto a combined signal;

amplifying the combined signal in a medium that adds amplified spontaneous emission to the combined signal to generate an amplified combined signal;

converting a portion of the amplified combined signal into an electrical signal containing signal-spontaneous beat noise;

extracting from the electrical signal a time-dependent waveform of the signal-spontaneous beat noise;

deriving from the time-dependent waveform of the signal-spontaneous beat noise a first scalar parameter proportional to an optical signal to noise ratio of one of a plurality of multiplexed communication channels in the combined signal; and deriving from the time-dependent waveform of the signal-spontaneous beat noise a second scalar parameter proportional to the optical signal to noise ratio of one other of the plurality of multiplexed communication channels in the combined signal.

18. The apparatus of claim 17, wherein deriving the first scalar parameter and the second scalar parameter comprises:

computing a non-linear mathematical function of the time-dependent waveform of the signal-spontaneous beat noise; and comparing the non-linear mathematical function of the time-dependent waveform of the signal-spontaneous beat noise to a mathematical function of the distinct profile in time of a communication channel.

19. The apparatus of claim 18, wherein comparing the non-linear mathematical function of the time-dependent waveform of the signal-spontaneous beat noise to the mathematical function of the distinct profile in time of the communication channel comprises matching a frequency peak of the non-linear mathematical function of the time-dependent waveform of the signal-spontaneous beat noise to a frequency peak of a mathematical function of the distinct profile in time of the communication channel.

20. The apparatus of claim 18, wherein the comparing the non-linear mathematical function of the time-dependent waveform of the signal-spontaneous beat noise to a mathematical function of the distinct profile in time of a communication channel is implemented by a code-division multiple access pattern decoder.

* * * * *